Dec. 11, 1956　　　　　　J. HIRAK　　　　　　2,773,705
WRITING PAD SUPPORT OR DESK FOR VEHICLES
Filed Feb. 24, 1954　　　　　　　　　　　　2 Sheets-Sheet 2
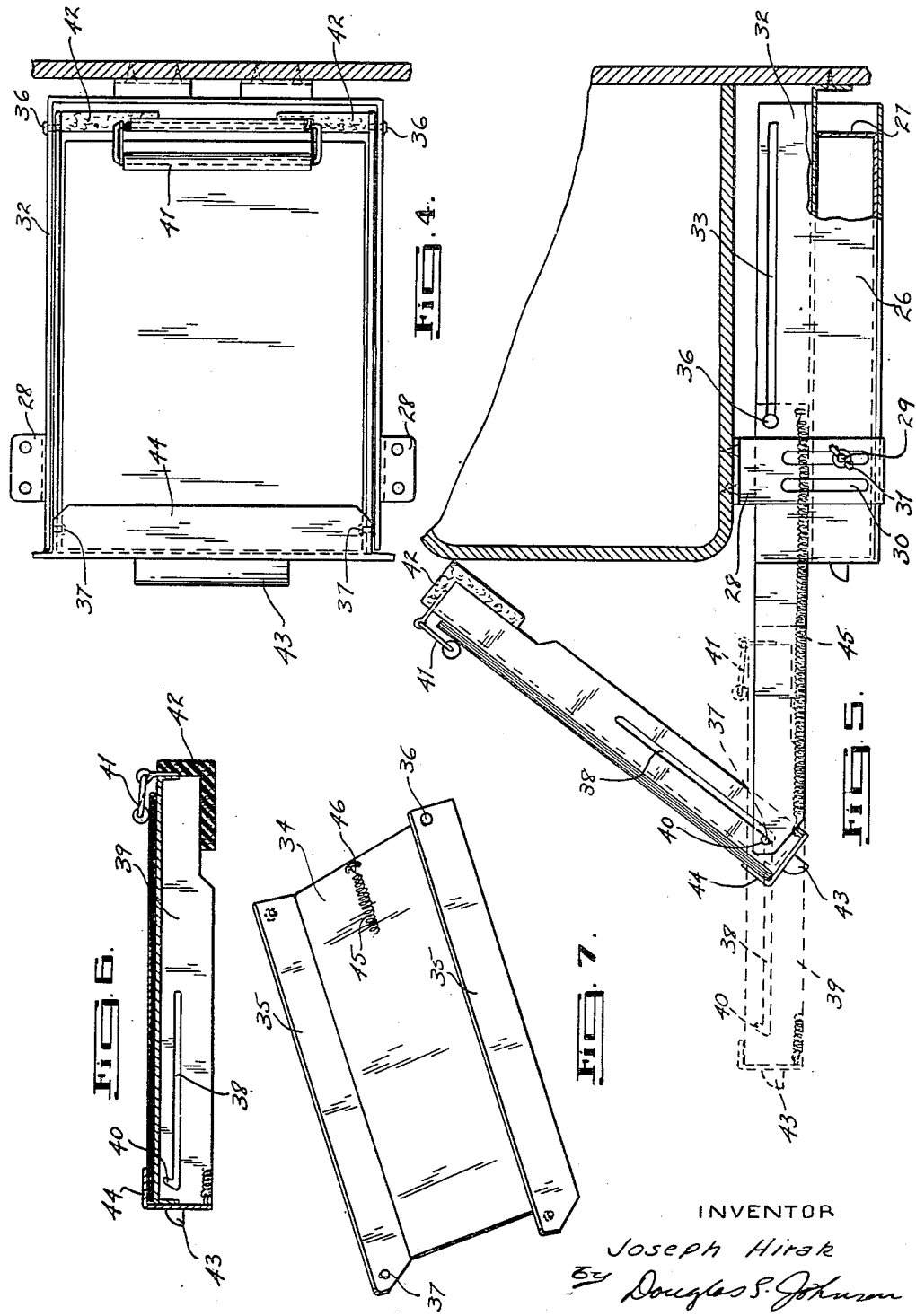
INVENTOR
Joseph Hirak
By Douglas S. Johnson
ATTY.

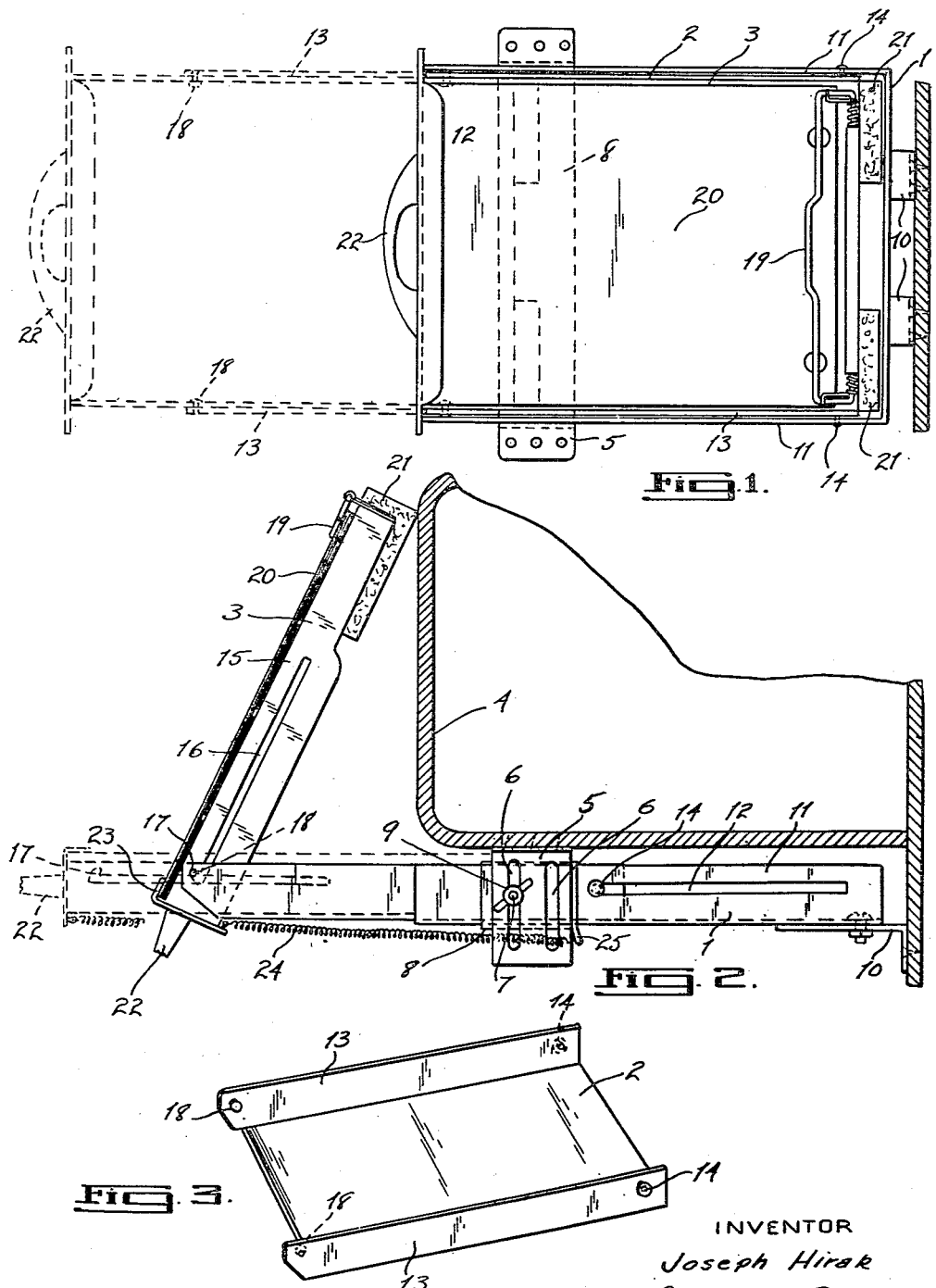

United States Patent Office
2,773,705
Patented Dec. 11, 1956

2,773,705

WRITING PAD SUPPORT OR DESK FOR VEHICLES

Joseph Hirak, Toronto, Ontario, Canada

Application February 24, 1954, Serial No. 412,275

4 Claims. (Cl. 281—44)

This invention relates to a writing pad support or desk for use in vehicles. The principal object of the invention is to provide an improved support or desk for a writing pad or the like for vehicles, which support can be quickly and easily moved between a retracted out-of-the-way position and a position disposed at a convenient angle for writing.

In particular it is the object of the invention to enable the support or desk to be moved between its retracted and operative positions while moving within very restricted or confined limits to eliminate interference with any part of the vehicle or its occupants.

Another important object is to provide a device as aforesaid which can be easily and quickly mounted relative to the dashboard of a vehicle.

Still another object is to provide a device which will not mar or scratch the dashbord or vehicle finish.

Again it is an object to provide a writing desk which will incorporate a storage drawer.

The principal feature of the invention resides in providing a support structure adapted to be supported relative to the dashboard and carrying a slide which in turn slidably and pivotally supports a table or desk-like holder or writing pad or the like, the combined sliding movement of the slide and holder allowing the holder to be drawn horizontally outwardly so that its inner end is clear of the dashbord, whereupon it can be moved under a combined swinging and sliding motion to an upwardly inclined position with the inner or upper end supported from the dashboard. In this respect the preferred form of the invention provides a slide comprising a simple channel member carrying two sets of pins, one set slidably engaging in slots in spaced walls presented by the support, and the other set engaging in slots in spaced walls presented by the pad holder or desk member.

Another feature of the invention resides in providing a notch arrangement at the termination of the slots at the forward end of the desk member whereby the one set of pins are adapted to enter the notches with the desk member in the inclined dashboard-engaging position to fix the forward or lower end of the desk member in this position against accidental dislodgement under writing.

Again a feature resides in providing spring means functioning to retract the desk member when same is in a horizontal position and to actuate the desk member and slide into a relative position with the desk member in the inclined position to maintain one set of pins in the notches.

These and other objects and features will become apparent from the following description taken in conjunction with the accompanying drawings, in which:

Figure 1 is a plan view of a writing desk or writing pad support constructed in accordance with the invention.

Figure 2 is a side elevational view of the device of Figure 1 illustrating its manner of operation.

Figure 3 is a perspective view of the slide.

Figure 4 is a plan view of a slightly modified form of desk.

Figure 5 is a side elevational view of the desk of Figure 4 showing its manner of operation and part of the device being broken away.

Figure 6 is a longitudinal vertical sectional view of the desk member of the desk of Figure 5.

Figure 7 is a perspective view of the slide incorporated in the desk illustrated in Figures 4 and 5.

Referring first to Figures 1 to 3, the writing pad support or desk device comprises a support frame 1, a slide 2 and a writing pad support or desk member 3. The frame 1 is secured beneath a dashboard 4 of a vehicle by means of brackets 5 provided with vertical slots 6 through which project screws 7 carried by a cross brace 8, the cross brace being vertically adjustable and being clamped in position by wing nuts 9. Additionally, rear brackets 10 are provided to support the rearward end of the frame 1.

The frame 1 presents spaced side walls 11 provided with slots 12. The slide 2 is provided with spaced side walls 13 carrying outwardly projecting pins 14 engaging in the slots 12 to provide a pin-and-slot interlock between the slide and support frame 1.

The desk member 3 is of channel formation having again spaced side walls 15 provided with slots 16 terminating at their forward ends in upwardly projecting offset slot portions 17.

The spaced walls 13 of the slide 2 carry inwardly projecting pins 18 which are adapted to interengage in the slots 16 of the desk member 3, with the side walls of the desk member 15 fitting snugly within the side walls 13 of the slide, which in turn fit snugly within the side walls 11 of the frame 1.

The pin and slot inter-connection between the slide 2 and the desk member 3 support the desk member 3 for both slidable and pivotal movement, as hereinafter more fully described.

Mounted at the inner end of the slide 2 is a spring-actuated retainer 19 adapted to hold a pad 20 of writing material on the upper surface of the desk member 3. The inner end surface and bottom surface adjacent the inner end is covered by a resilient protecting body 21, such as rubber or sponge. The forward end of the desk member 3 is provided with a handle 22 and an overturned flange portion 23, beneath which the pad 20 is adapted to lie to further secure the pad in position.

A spring 24 connected between an abutment 25 and the front of the desk member 3 acts to retract the desk member and is disposed below the pivot point of the desk member, as formed by the pins 18, to assist in swinging the desk member to its operative position.

When not in use, with the desk member 3 swung to an aligned position with the slide 2 and moved inwardly of the slide 2, the two units formed by the desk member and slide are moved inwardly on the frame 1 as guided by the spaced side walls 11 and slot-and-pin interlock 12 and 14 until the forward end of the desk member 3 is substantially flush with the forward surface of the dashboard 4.

To use the device the handle 22 is pulled outwardly, moving desk member 3 outwardly until the inner ends of the slots 16 engage the pins 18 of the slide whereupon the slide and desk member combined move outwardly until the inner end of the desk member 3 is clear of the forward face of the dashboard 4, whereupon the desk member 3 is swung on its pivots, as provided by the pins 18, and then pushed upwardly and towards the dashboard 4 until the resiliently covered inner end of the desk member rests on the dashboard and the pins 18 enter the offset slot portions 17 of the slots 16.

The movement of the pins 16 into these offset slot portions thus prevents relative sliding movement between the slide 2 and the desk member 3 to maintain it in the solid-line position of Figure 2. In this regard it will be noted that the spring 24 acts to restrain the relative movement of the desk member 3 and slide 2, preventing accidental movement of the pins 18 out of the offset slot portions 17, thereby assisting in maintaining the desk member 3 in the position of Figure 2 against accidental displacement.

Preferably the fit between the slide 2 and the frame sides 11 is such as to provide an appreciable friction to prevent accidental inward movement of the slide from the position of Figure 2, and it has not been found necessary to provide any additional stop means to prevent accidental retraction of the slide.

Figures 4 to 7 illustrate a somewhat modified form of the invention wherein the cross brace 8 has been replaced by a drawer frame 26 to accommodate a drawer 27 to equip the desk unit with a storage drawer. The drawer frame 26 is supported by brackets 28 corresponding to the brackets 5, with the frame 26 carrying screws 29 operating through slots 30 and carrying the clamping wing nuts 31. The support frame 32 corresponding to the frame 1 is again provided with slots 33 in the side walls and the slide 34 is provided with side walls 35 nesting within the side walls of the support frame 32 and carrying an arrangement of pins 36 and 37 to engage respectively in the slots 33 of the support frame and slots 38 in the side walls of the desk member 39.

Again the slots of the desk member are provided with upward extensions 40 at the forward end to receive the pins 37, with the desk member in its operative writing position, as illustrated in Figure 5. Again the desk member is provided with a suitable writing pad spring retainer 41 and cushioning means 42, operating handle 43 and retaining flange 44.

A spring 45 corresponding to the spring 24 is provided to extend between a lug 46 on the slide 34 and the forward end of the desk member 39, acting to retract the desk member relative to the slide and to hold the slide pins 37 in the slot extensions 40 of the desk member.

It will be appreciated that the combined sliding and pivotal connection of the desk member 39, again as afforded by the use of the slide 34 and the pin-and-slot connection between the slide and the desk member, allows the desk member to be drawn outwardly while in a horizontal position until the inward end clears the dashboard and then moved upwardly and inwardly to the operating position of Figure 5. With this movement there is a minimum in the limits of movement required to move the desk member from the inoperative to the operative position.

It will be understood that variations in detail of construction may be made without departing from the scope of the appended claims.

What I claim as my invention is:

1. A writing desk for vehicles comprising a support having spaced longitudinal guide members, means for securing said support beneath a dashboard, a slide sliding on said guide members, said slide and guide members having a slot and pin interlock therebetween, a desk member having longitudinally slotted sides, pin means on said slide engaging in the slots of said desk member sides to support said desk member for horizontally slidable and pivotal movement relative to said slide, the slots of said desk member sides having lateral extensions to receive said slide pin means with said slide and desk members in predetermined relatively inclined positions to maintain said slide and desk members against relative sliding movement, and spring means secured to said desk member at one side of the pivot axis and to the rearward end of said slide member, said spring means acting to maintain said slide pin means in said slot extensions.

2. A writing desk for vehicles comprising a support having spaced longitudinal guide members, means for securing said support relative to a dashboard to extend longitudinally of a vehicle, a slide formed with spaced sides fitting within and sliding on said guide members between a retracted position and a position projecting forwardly of a dashboard, said slide and guide members having a slot and pin interlock therebetween, a desk member having longitudinally slotted sides adapted to fit within the sides of said slide, pin means carried by the sides of said slide and engaging in the slots of the walls of said desk member to slidably and pivotally support said desk member from said slide, the slots of said desk member adjacent the forward end in relation to a dashboard mounting having upward extensions adapted to receive said slide pin means with said desk member inclined upwardly relative to and moved upwardly of said slide, and spring means secured to said desk member at one side of the pivot axis and to the rearward end of said slide member, said spring means restraining said desk member from movement outwardly of said slide and said pin means from movement out of said slot extensions.

3. A device as claimed in claim 2 in which said means for securing said support relative to a dashboard comprises a pair of brackets having depending legs, and means vertically adjustable on said legs engaging and supporting said support.

4. A device as claimed in claim 3 in which the vertically adjustable means comprises a drawer element.

References Cited in the file of this patent

UNITED STATES PATENTS

| | | |
|---|---|---|
| 1,518,197 | Harrison et al. | Dec. 9, 1924 |
| 2,522,602 | Burns | Sept. 19, 1950 |
| 2,583,647 | Haynes | Jan. 29, 1952 |
| 2,621,093 | Merhege et al. | Dec. 9, 1952 |